United States Patent

Howard

[15] 3,700,270
[45] Oct. 24, 1972

[54] LEAK CLAMP ASSEMBLIES

[72] Inventor: David Campbell Howard, Newcastle upon Tyne, England

[73] Assignee: The Gas Council, London, England

[22] Filed: March 8, 1971

[21] Appl. No.: 121,944

[52] U.S. Cl..................................285/337, 285/421
[51] Int. Cl...............................................F16l 21/00
[58] Field of Search.......285/337, 421, 15, 16; 85/77

[56] References Cited

UNITED STATES PATENTS

| | | | |
|---|---|---|---|
| 3,352,579 | 11/1967 | Hoke | 285/337 |
| 1,194,209 | 8/1916 | Middaugh | 285/421 X |
| 1,823,428 | 9/1931 | Hill | 85/77 |
| 1,951,034 | 3/1934 | Norton | 285/337 X |
| 3,376,056 | 4/1968 | Linstead | 285/421 X |

Primary Examiner—Thomas F. Callaghan
Attorney—Holcombe, Wetherill & Brisebois

[57] ABSTRACT

A leak clamp assembly for repairing a leak in a spigot and socket joint in a gas pipe includes a split sealing ring of resilient material which is placed around the spigot and against the outer face of the socket and a split rigid backing-up ring which is also placed around the spigot on the side of the sealing ring remote from the socket and a series of clamps which act between the backing-up ring and the back face of the socket. The backing-up ring comprises at least two arcuate sections containing a bolt hole at each end, the sections being connected end to end to form the ring and overlapping at their junctions so that the corresponding holes are at least partly in register with each other. The clamps comprise bolts for passing through the pairs of overlapping holes and designed to engage behind the socket preferably with an anchor ring which is assembled around the pipe behind the socket. The bolts comprise a conventional shank for cooperation with a nut and a head which tapers to the shank, the arrangement being such that the backing-up ring section can be arranged with the bolt holes overlapping to a minimum degree around the shanks of the bolts to provide the backing-up ring with a maximum size, but on tightening the nuts on the bolts, the tapered heads are drawn into the overlapping holes thus increasing the extent of the overlap and drawing the backing-up ring sections further together until the backing-up ring tightly engages the sealing ring and clamps it around the spigot and against the face of the socket of the spigot and socket joint.

4 Claims, 3 Drawing Figures

Patented Oct. 24, 1972

LEAK CLAMP ASSEMBLIES

If a leak occurs in a spigot and socket joint of a gas main, the most usual way of repairing it and resealing the joint is by means of a leak clamp assembly. The usual kind of assembly consists of a split sealing ring of resilient material which is placed around the spigot and against the outer face of the socket and a split rigid backing-up ring which is also placed around the spigot on the side of the sealing ring remote from the socket and a series of clamps which act between the backing-up ring and the back face of the socket. These clamps, which may be in the form of bolts acting between the backing-up ring and an anchor ring placed around the pipe behind the socket, force the backing-up ring against the sealing ring and in turn force the sealing ring inwards against the spigot and axially against the face of the socket to make a seal.

In these assemblies, there is no provision for radial adjustment of the backing-up ring and consequently difficulty is often encountered in adequately fitting an assembly which fits a pipe joint of one nominal size to different types of joint which vary only slightly from the nominal size. Sometimes, difficulty is encountered even with joints of the same type and nominal size, since there is often a wide variation in manufacturing tolerances within each nominal size.

With the aim of overcoming this disadvantage, according to the present invention, the backing-up ring of a leak clamp assembly of the kind described comprises at least two arcuate sections each containing a bolt hole at each end, the sections being connected end to end to form the ring and overlapping at their junctions so that the corresponding holes are at least partly in registry with each other, and the bolts for passing through the overlapping bolt holes each comprise a conventional shank for cooperation with a nut, and a head which tapers to the shank, the dimension of each of the overlapping bolt holes in a circumferential direction with respect to the backing-up ring being greater than the diameter of the shank of each bolt and less than the maximum dimension of the head of each bolt, so that on assembly, the backing-up ring sections can be arranged so that the overlapping bolt holes overlap to a minimum degree around the shanks of the bolts to provide the backing-up ring with a maximum size, but as the bolts are tightened, the tapered heads are gradually drawn into the overlapping bolt holes, thus forcing the degree of overlap of the holes to increase and drawing the sections further together until the backing-up ring tightly engages the sealing ring.

In operation, if a seal in a spigot and socket joint becomes faulty and repair is necessary, a new sealing ring, i.e., the sealing ring of a leak clamp assembly in accordance with the present invention is positioned around the spigot adjacent the end face of the socket, and the backing-up ring is then assembled around the spigot adjacent the face of the sealing ring remote from the end of the socket.

If the leak clamp assembly is of the kind in which the bolts act between the backing-up ring and an anchor ring placed behind the socket, the anchor ring is also split into sections, these preferably being arranged to be assembled in a manner similar to the backing-up ring sections. Each section of the anchor ring is provided with a lug which projects radially from between its ends, preferably at its middle, the lug having a bolt hole for receiving the shank of a bolt. In use the anchor ring is placed around the socket so that its sections are angularly displaced with respect to the sections of the backing-up ring and so that each set of overlapping bolt holes of the backing-up ring is aligned with a lug bolt hole in the anchor ring. Preferably the sections of the backing-up ring are also each provided with a radial outwardly projecting lug between its ends and having an axially extending hole, and the assembly includes further bolts having a threaded shank portion and a tapering head portion. The arrangement is such that when the overlapping bolt holes of the backing-up ring are aligned with the lug bolt holes of the anchor ring, overlapping bolt holes at the ends of the anchor ring sections are also aligned with the lug bolt holes in the backing-up ring. The bolts are then arranged through the aligned sets of bolt holes with the tapered head of each bolt adjacent the side of its respective set of overlapping bolt holes remote from the corresponding lug on the opposite ring, and with the nut engaging with the bolt shank adjacent the side of the lug remote from the overlapping bolt holes. As the nuts are tightened on the bolts, the backing-up ring and the anchor ring are drawn towards each other and contracted until the anchor ring engages tightly behind an annular shoulder around the socket and the backing-up ring forces the sealing ring tightly against the spigot and the face of the socket.

With this arrangement the internal size of the backing-up ring and of the anchor ring is adjustable between a maximum when the overlapping bolt holes at the ends of the ring sections overlap to a minimum degree with merely the shanks of the bolts passing through them, and a minimum when the tapered heads of the bolts have forced the overlapping bolt holes to register fully with each other. This adjustment is ample to accommodate variations in tolerances found with each nominal size of a particular pipe joint, and also to accommodate differences in different types of pipe joint of the same nominal size.

An example of a leak clamp assembly in accordance with the present invention is illustrated in the accompanying drawings, in which.

Figure 1:
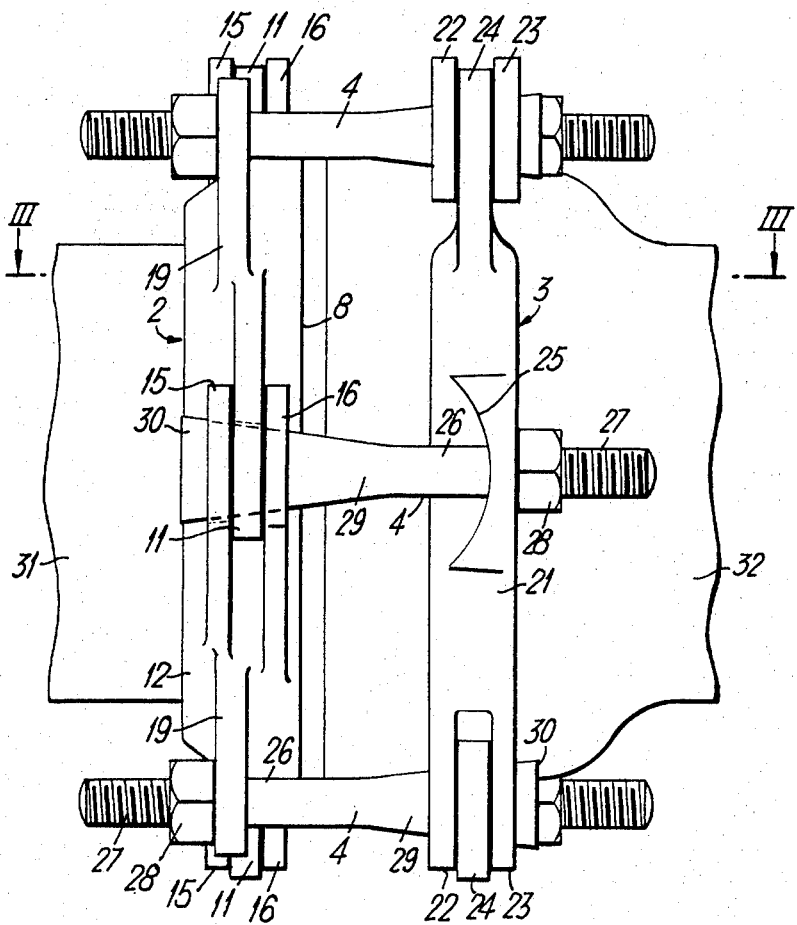
FIG. 1 is a side elevation of the assembly illustrating how it is used to seal a spigot and socket joint in a pipeline.
Figure 2:
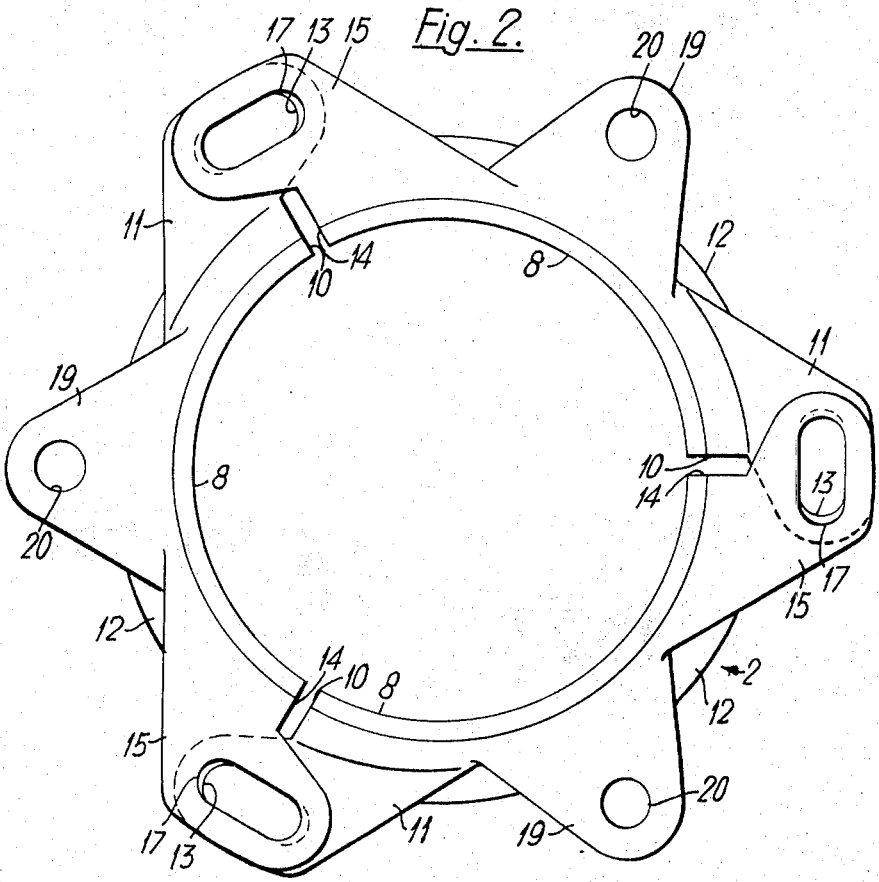
FIG. 2 is an elevation of the backing-up ring as seen from the left-hand side of FIG. 1, but without the pipe and the bolts; and, FIG. 3 is a radial section through the leak clamp assembly shown in FIG. 1 and taken on the lines 3—3 in FIG. 1.

The leak clamp assembly shown in the drawings is of the kind comprising a split sealing ring 1, a backing-up ring 2, an anchor ring 3, and bolts 4 which act between the backing-up ring and the anchor ring.

The sealing ring 1 is of the kind which is described in detail in our British Pat. Specification No. 1,147,375, it being a composite ring formed by an outer ring 5 made of neoprene and an inner harder ring 6 made of nylon '11'. The radially outer corner of the ring 5 diagonally opposite the ring 6 is chamfered to form a face 7 which is inclined at an angle of 35° to the axis of the ring 1.

The backing-up ring 2 comprises three identical ductile iron castings in the form of 120° arcuate sections 8 which together form the ring 2 when assembled end to end. The radially inner periphery 9 of the ring sections 8 is smooth and is also inclined at an angle of 35° to the axis of the assembled ring 2. Each ring section 8 has at one end 10 a lug 11 which projects radially outwards from the outer periphery 12 of the ring section 8 and which also extends beyond the end 10 of the section 8 in a direction which is substantially tangential to the section at its end 10. The lug 11 contains a bolt slot 13, the longitudinal axis of which also extends in a direction which is tangential to the section 8 at its end 10. At its other end 14, each ring section 8 has a pair of lugs 15 and 16 which project from the outer periphery 12 of the section 8 in a manner similar to the lug 11. The lugs 15 and 16 project parallel to each other and have bolt slots 17 and 18 respectively which are aligned with each other. The slots 17 and 18 are similar to the slot 13, with their longitudinal axes extending in a direction which is tangential to the section 8 at its end 14. The lugs 15 and 16 are arranged so as to snuggly receive between them the lug 11 at the end 10 of an adjacent ring section 8 when the section 8 are assembled together to form the ring 2. In this position the bolt slots 13, 17 and 18 at each junction between adjacent sections 8 overlap each other. When the ends 10 and 14 of adjacent sections at each junction are in contact, the bolt slots 13, 17 and 18 completely overlap each other and are aligned. Each ring section 8 also has a further lug 19 projecting radially outwards from its outer periphery 12 and midway between the ends 10 and 14 of the section 8. The lug 19 contains a circular bolt hole 20, the diameter of which corresponds to the width, i.e., the radial dimension, of the bolt slots 13, 17 and 18.

The anchor ring 3 comprises three ring sections 21 which are constructed and assembled in a similar manner to the ring sections 8 of the backing-up ring 2. The main difference between the two rings 2 and 3 is that the internal periphery, and hence the external periphery also, is substantially parallel to its axis instead of being inclined. Each anchor ring section 21 has a pair of lugs 22 and 23 at one end and a single lug 24 at its other end which is arranged to fit between the two lugs 22 and 23 at the end of an adjacent section 21 when the ring 23 is assembled. As with the ring 2, the lugs 22, 23 and 24 have bolt slots which overlap when the ring is assembled. Each ring section 21 is also provided with a lug 25 midway between its ends and corresponding to the lug 19 on a backing-up ring section 8.

There are six bolts 4, and each comprises a conventional shank portion 26 having a screw thread 27 for cooperation with a nut 28. The diameter of the shank portion 26 is such that it is just able to pass through the bolt slots and holes 13, 17, 18 and 20 of the ring 2 and also through the corresponding slots and holes in the ring 3. The shank portion 26 of each bolt 4 merges into a wedge-shaped head portion 29. The thickness of the head portion 29 remains the same as that of the shank portion 26, while the breadth of the head portion at its free end 30 is greater than the longitudinal extent of the bolt slots of the two rings 2 and 3.

Figure 3:
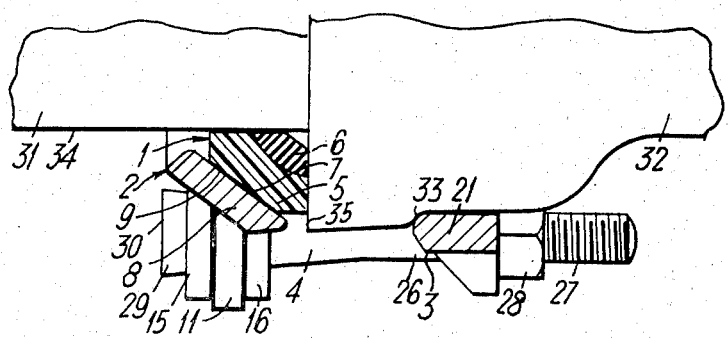

In use, the leak clamp assembly just described is used to reseal a spigot and socket joint between adjacent pipe sections 31 and 32 (FIGS. 1 and 3) after the original join seal has developed a leak. First of all the sealing ring 1 is arranged around the spigot part of the pipe section 31 and the backing-up ring 2 is then assembled around the sealing ring with the inclined inner periphery 9 of the backing-up ring 2 mating with or closely adjacent the chamfered corner 7 of the sealing ring 1. The backing-up ring 2 is held in the assembled position by means of the shank portions 26 of the bolts 4 which are inserted through the overlapping bolt holes 13, 17 and 18 of the ring sections 8. In this position the bolt slots overlap only sufficiently for the shanks 26 of the bolts 4 to pass through, and the diameter of the backing-up ring 2 is therefore at a maximum. The anchor ring 3 is then assembled around the socket part of the pipe section 32 so that it is 60° out of phase with the arrangement of the backing-up ring 2. This brings the bolt holes in the lugs 25 of the anchor ring 3 directly opposite the overlapping bolt slots 13, 17 and 18 of the backing-up ring 2, and the overlapping bolt slots of the anchor ring 3 directly opposite the bolt holes 20 of the backing-up ring 2. The bolts 4 which are projecting through the overlapping bolt slots 13, 17 and 18 of the backing-up ring 2 are then inserted further so that the shank portion extends through the bolt holes in the lugs 25 of the anchor ring 3, nuts 28 then being engaged with the threaded portion 27 of these bolts 4. Similar bolts 4 are then inserted from the opposite direction through the overlapping bolt slots of the anchor ring 3, the threaded portions 27 of these bolts projecting through the bolt holes 20 of the backing-up ring 2 and engaging with corresponding nuts 28. Tightening the nuts 28 causes the wedge-shaped head portions 29 of the bolts 4 to be drawn into the overlapping bolt slots of the two rings 2 and 3, thus drawing the two rings towards each other and also progressively increasing the amount of overlap between the bolt slots of the ring sections and accordingly drawing the ring sections radially inwards. In doing this the anchor ring 3 engages the external periphery of the socket of the pipe section 32 behind an external lip 33 on the socket. This prevents any further movement of the anchor ring 3 and the backing-up ring 2 is then forced into engagement with the sealing ring 1. Because of the arrangement of the inclined surfaces 9 and 7 of the backing-up ring 2 and the sealing ring 1 respectively, the sealing ring 1 is forced into engagement with both the outer periphery 34 on the spigot 31 and the end face 35 of the socket 32 so that a tight seal is formed. The fact that the diameter of the rings 2 and 3 is adjustable between a maximum when the bolt slots overlap to a minimum extent and a minimum when these bolt slots overlap completely, enables the leak clamp assembly to be used with pipe joints of slightly varying sizes or joints which are normally of the same size but which vary within a wide degree of manufacturing tolerance.

I claim:

1. In a leak clamp assembly for re-sealing a spigot and socket joint in a gas pipe, said assembly including a split sealing ring of resilient material and a split rigid backing-up ring adapted to surround the spigot of said spigot and socket joint, a split anchor ring adapted to surround the socket of said joint, and a plurality of clamps for acting between said backing-up ring and said anchor ring whereby said backing-up ring clamps said sealing ring around said spigot and against the face of said socket, the improvement wherein said backing-up ring and said anchor ring each comprises at least two arcuate sections each of which ring sections includes a radially outwardly projecting lug between its ends having means defining a hole extending in an axial direction through said lug, and means at each end of each ring section defining a circumferentially elongated hole at each end extending in an axial direction through said section, said backing-up ring sections being adapted to mate together with adjacent ends of said sections in overlapping relationship and said corresponding elongated end holes at least partly in register with each other, and said anchor ring sections being adapted to mate together in overlapping relationship in a similar manner to said backing-up ring sections whereby said backing-up ring and said anchor ring may be set angularly with respect to each other in an operative position wherein each pair of registering end holes in said backing-up ring is aligned with a lug hole in said anchor ring and each pair of registering end holes in said anchor ring is aligned with a lug hole in said backing-up ring, and said clamps comprise a plurality of bolts for extending one through each set of aligned holes and a plurality of nuts for co-operation with said bolts, each of said bolts having a screw threaded shank for receiving one of said nuts and a head which tapers from a wider portion towards said shank, the maximum dimension of said wider portion being greater than the dimension of each of said elongated end holes in the direction of elongation, whereby in use, with the anchor ring and backing-up ring in said operative position and said bolts located through said aligned holes with said bolt heads adjacent said pairs of registering end holes and said nuts engaging said shanks adjacent said lug holes, said backing-up ring and anchor ring are formed each with a maximum diameter while said registering end holes overlap to a minimum extent around said shanks but as said nuts are tightened on said bolts said tapered heads are drawn into said registering end holes thus increasing the extent of their overlap and drawing said ring sections further together until said anchor ring tightly engages said socket and said backing-up ring tightly engages said sealing ring and clamps it against said spigot and said face of said socket.

2. An assembly as claimed in claim 1, wherein each of said lugs on said anchor ring sections and said backing-up ring sections projects radially outwards at a point mid-way between the ends of its associated ring section.

3. An assembly as claimed in claim 1, wherein one end of each of said sections of said backing-up ring and each of said sections of said anchor ring is bifurcated and the adjacent end of the adjacent ring section is arranged to fit into said bifurcated end.

4. An assembly as claimed in claim 1, wherein said backing-up ring and said anchor ring each consists of three similar sections.

* * * * *